United States Patent [19]

Fuse et al.

[11] Patent Number: 5,089,812
[45] Date of Patent: Feb. 18, 1992

[54] LIQUID-CRYSTAL DISPLAY

[75] Inventors: Takahiro Fuse; Akira Hasegawa, both of Tokyo; Takeshi Matsuoka, Kawasaki, all of Japan

[73] Assignee: Casio Computer Co., Ltd., Tokyo, Japan

[21] Appl. No.: 312,614

[22] Filed: Feb. 17, 1989

[30] Foreign Application Priority Data

Feb. 26, 1988 [JP] Japan .................................. 63-43484
May 13, 1988 [JP] Japan ................................. 63-116359

[51] Int. Cl.$^5$ ............................................. G09G 3/00
[52] U.S. Cl. ..................................... 340/793; 340/784
[58] Field of Search ............... 340/793, 784, 765, 728; 350/333, 332; 358/236, 241

[56] References Cited

U.S. PATENT DOCUMENTS 4,511,926 4/1985 Crossland et al. .................. 340/784
4,737,782 4/1988 Fukuma et al. ..................... 340/793

OTHER PUBLICATIONS

Tannas, "Flat-Panel Display and CRTs", 1985, pp. 21-24.

Primary Examiner—Ulysses Weldon
Assistant Examiner—Xiao M. Wu
Attorney, Agent, or Firm—Frishauf, Holtz, Goodman & Woodward

[57] ABSTRACT

A liquid-crystal display includes common electrodes and segment electrodes and responds to signals applied to the common electrodes and the segment electrodes, to display an image. A display controller responds to a received signal to generate a gradation indicating signal indicating a gradation of each of the pixels of the display. A common driver simultaneously selects k adjacent common electrodes for scan, compensates the gradation indicating signal, and supplies the compensated signal to the segment electrodes in order to decrease the difference between the gradation of each pixel indicated by the gradation indicating signal and an actually displayed gradation which results from the simultaneous selection of the common electrodes.

17 Claims, 10 Drawing Sheets

FIG. 2A (PRIOR ART) $\overline{HD}$

FIG. 3A (PRIOR ART) $\overline{HD}$

| S NO. | INPUT DATA Y | SUBTRACT OUTPUT | LIMITER OUTPUT Y' | ACTUAL DISPLAYED GRADATION Z1 | CONVENTIONAL DISPLAYED GRADATION Z2 |
|---|---|---|---|---|---|
| 1 | 0 | 0 | 0 | 0.00 | 0.00 |
| 2 | 0 | 0 | 0 | 0.00 | 0.00 |
| 3 | 0 | 0 | 0 | 0.00 | 0.00 |
| 4 | 0 | 0 | 0 | 0.00 | 0.00 |
| 5 | 4 | 16 | 7 | 1.75 | 1.00 |
| 6 | 5 | 13 | 7 | 3.50 | 2.25 |
| 7 | 7 | 14 | 7 | 5.25 | 4.00 |
| 8 | 7 | 7 | 7 | 7.00 | 5.75 |
| 9 | 7 | 7 | 7 | 7.00 | 6.50 |
| 10 | 6 | 3 | 3 | 6.00 | 6.75 |
| 11 | 4 | −1 | 0 | 4.25 | 6.00 |
| 12 | 2 | −2 | 0 | 2.50 | 4.75 |
| 13 | 0 | −3 | 0 | 0.75 | 3.00 |
| 14 | 0 | 0 | 0 | 0.00 | 1.50 |
| 15 | 0 | 0 | 0 | 0.00 | .50 |
| 16 | 1 | 4 | 4 | 1.00 | .25 |
| 17 | 2 | 4 | 4 | 2.00 | .75 |
| 18 | 4 | 8 | 7 | 3.75 | 1.75 |
| 19 | 6 | 9 | 7 | 5.50 | 3.25 |
| 20 | 7 | 10 | 7 | 6.25 | 4.75 |
| 21 | 7 | 7 | 7 | 7.00 | 6.00 |
| 22 | 1 | −17 | 0 | 5.25 | 5.25 |
| 23 | 1 | −10 | 0 | 3.50 | 4.00 |
| 24 | 1 | −3 | 0 | 1.75 | 2.50 |
| 25 | 2 | 8 | 7 | 1.75 | 1.25 |
| 26 | 3 | 5 | 5 | 3.00 | 1.75 |
| 27 | 5 | 8 | 7 | 4.75 | 2.75 |
| 28 | 6 | 5 | 5 | 6.00 | 4.00 |
| 29 | 6 | 7 | 7 | 6.00 | 5.00 |
| 30 | 6 | 5 | 5 | 6.00 | 5.75 |

LIQUID-CRYSTAL DISPLAY

BACKGROUND OF THE INVENTION

1. Field of the Invention

The present invention relates to a driver of a dot-matrix liquid-crystal display panel.

2. Description of the Related Art

Figure 1:
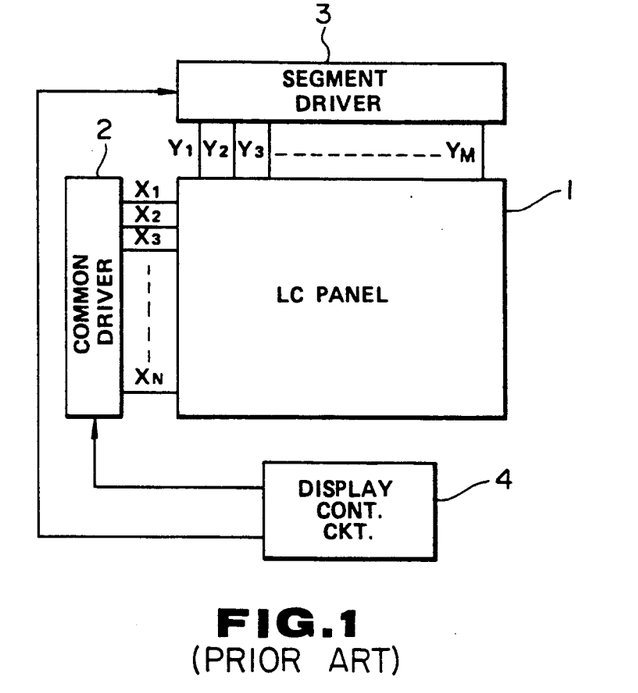
FIG. 1 is a block diagram of a conventional liquid-crystal display.

FIG. 1 shows an arrangement of a conventional liquid-crystal display panel and its associated driver circuits. The arrangement of FIG. 1 comprises a dot-matrix liquid-crystal display panel 1; a common driver 2 for driving common (scan) electrodes X1 through Xn of liquid-crystal display panel 1; a segment driver 3 for driving segment (signal) electrodes Y1 through Ym; and a display control circuit 4 for controlling common driver 2 and segment driver 3. Waveforms for the FIG. 1 arrangement are illustrated in FIGS. 2A-2E and 3A-3E.

Figure 2A:
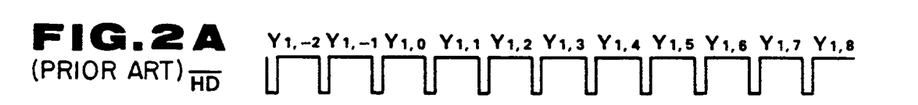
Figure 2B:
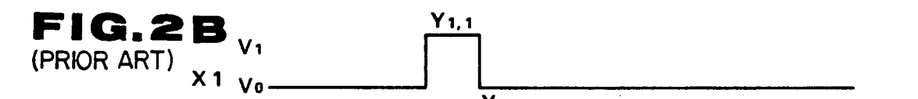
Figure 2C:
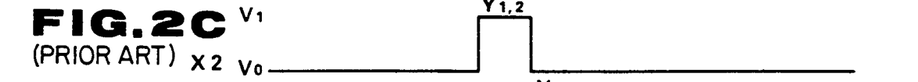
Figure 2D:
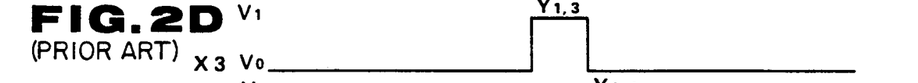
Figure 2E:
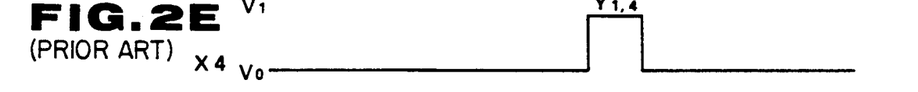

A prior art method for driving a liquid-crystal display panel 1, uses a time-division driving method. Referring to FIGS. 2A through 2E, a simple time-division driving method will be described taking, as an example, segment electrode Y1 and common electrodes X1-X4. FIG. 2A shows a horizontal synchronizing signal $\overline{HD}$ for determining the timing of application of a gradation signal to segment electrode Y1. A gradation signal is supplied to a segment electrode in synchronization with the fall of, for example, (FIG. 2A) an HD (horizontal synchronizing signal), i.e., in synchronization with the beginning of a selection period of a common electrode. FIGS. 2A to 3E show the timing of supply of signals, picking out Y1 from N segment electrodes and X1 to X4 from M common electrodes. Other segment electrodes also are supplied with gradation signals at the same timing. FIGS. 2B through 2 show the timing of application of common signals to common electrodes X1-X4 of common electrodes X1-Xn. In the figures, common electrodes X1-X4 are sequentially selected and gradation signals Y1,1-Y1,4 are applied to segment electrode Y1 in synchronization with selection of a common electrode. Pixels at the intersections of common electrodes X1-X4 and segment electrode Y1 are displayed in gradations (brightness) defined by signals Y1,1-Y1,4.

Such a driving method as shown in FIGS. 2A-2E has a disadvantage, however, that the duty ratio is lowered as the number of the common electrodes increases, thus lowering the contrast of displayed images. The lower limit of the presently practicable duty ratio is about 1/100. Incidentally, in liquid-crystal display panels used in small television receivers, the number of common electrodes is usually around 240 (the number of effective scanning lines per field). Where such a great number of common electrodes are driven simply on a time-division basis as described above, the duty ratio would become 1/240. This will result in images of such low-contrast as to have no practical use. FIGS. 3A to 3E show an improved prior art time-division driving method for solving the low duty cycle problem. According to this prior art method, a common signal is supplied to common electrodes X1-X4 in the time in which gradation signals Y1, is output, and a selection signal is supplied to common electrodes X2-X5 in the timing in which graduation signal Y1, 2 is output. The selection signal is thus supplied to four common electrodes in the same timing and, in other words, four common electrodes are selected (driven) in the same timing. This driving method shown in FIGS. 3A-3E is an improvement of the single time-division driving method and basically gradation signal Yp, s corresponds to common electrode Xs as in the simple time-division driving method.

Having as its aim the solving of the low duty ratio problem, this improved prior art method selects common electrodes adjacent to the common electrode desired to be selected simultaneous therewith. Referring to FIGS. 3A through 3E, this prior art improved time-division driving method will be described taking segment electrode Y1 and common electrodes X1-X4 by way of example.

Figure 3A:
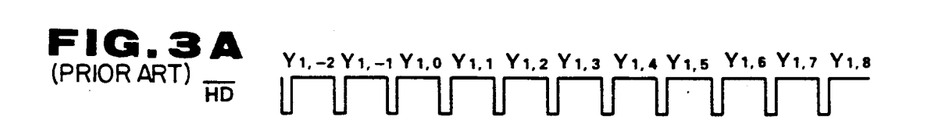
FIGS. 3A through 3E are timing diagrams showing the timing of application of signals in the liquid-crystal display of FIG. 1.
Figure 3B:
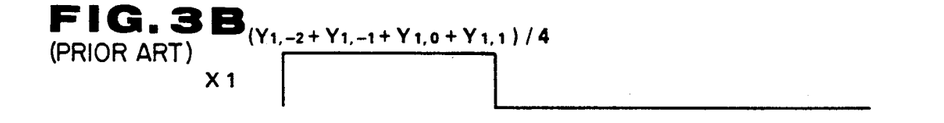
Figure 3C:
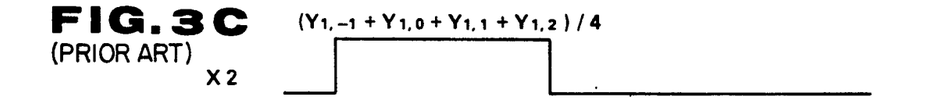
Figure 3D:
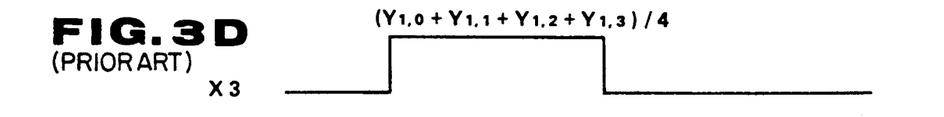
Figure 3E:
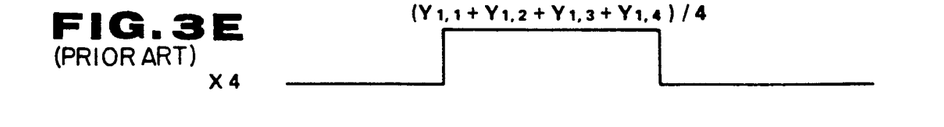

FIG. 3A shows the timing of application of a gradation signal to segment electrode Y1, and FIGS. 3B through 3E show the timing of application of common signals to common electrodes X1-X4. When common electrode X4 is selected, for example, segment electrode Y1 is supplied with gradation signals "Y1,1", "Y1,2", "Y1,3", and "Y1,4". Hence, the display time of each pixel, is four times as long as that in the case of the simple time-division driving method shown in FIGS. 2A-2E. In a liquid-crystal display for a small television receiver with 240 scanning lines, the duty ratio thus becomes a practical level of 1/60 (4/240); however, the average pixel gradation at the intersection of segment electrode Y1 and common electrode X4 will become $(Y1,1+Y1,2+Y1,3+Y1,4)/4$. This is because the amount of light transmitted through a liquid-crystal cell depends on the effective value of the voltage applied. Therefore, the displayed gradation of each pixel differs from the true (desired) gradation, with the result that the resolution is lowered.

SUMMARY OF THE INVENTION

It is accordingly an object of the present invention to provide a liquid-crystal display panel and a driving method therefor which permit a high-resolution display without a lowering of the contrast of the displayed images.

To attain the above object, a liquid-crystal display according to the invention comprises:

liquid-crystal display means (1) having a plurality of common electrodes (X1-XN) and a plurality of segment electrodes (Y1-YM) intersecting the common electrodes, the display means being responsive to signals applied to the common and segment electrodes, thereby to display an image made up of a plurality of pixels;

display control means (4, 15) for generating gradation indicating signals (Ym,n, Sa) for indicating the display gradation of each of the pixels of the liquid-crystal display means (1);

driving means (2,3,18, 19) coupled to the common electrodes, the segment electrodes, and the display control means, for applying signals to the segment electrodes while simultaneously selecting more than one common electrode from among the common electrodes, to drive the liquid-crystal display means by supplying common signals to the common electrodes, the driving means applying compensated signals (Y'm,n; b) obtained by compensation of the gradation indicating signals (Ym,n; a) to the segment electrodes so as to decrease a difference between the gradation of each pixel as indicated by the gradation indicating signal (Ym,n; Sa) and an actually displayed gradation, the gradation difference resulting from the simultaneous selection of more than one common electrode.

According to the liquid-crystal display constructed as above, high-contrast and high-resolution images can be obtained.

BRIEF DESCRIPTION OF THE DRAWINGS

FIGS. 2A. through 2E

DETAILED DESCRIPTION OF THE PREFERRED EMBODIMENTS

In the embodiments to be described hereinafter, it should be understood that although digital signal processing is performed, to facilitate understanding of the invention, analog signal processing may be used instead. Accordingly, in this specification, the term "signal" can refer to both analog and digital signals In the prior art, a signal supplied from a receiving circuit and specifying the gradation of each pixel and a signal applied to each segment electrode are substantially the same. However, in the following embodiments, these signals seldom correspond to each other. Therefore, to clearly differentiate between the two signals in the following embodiments, the signal supplied from the receiving circuit is referred to as the gradation indicating signal, while the signal actually applied to each segment electrode is referred to as the segment driving signal.

The principle of operation of a liquid-crystal display according to a first embodiment of the present invention will now be described. To facilitate understanding of the invention, the number of common electrodes which are simultaneously selected is assumed to be four. When the time of one horizontal scanning line is represented by "1H", one common electrode is continuously selected for "4H".

In the prior art shown in FIGS. 3A through 3E, a gradation Zm,n of the pixel at the intersection of common electrode Xn and segment electrode Ym is represented as follows:

$$Zm,n = (Ym,n-3 + Ym,n-2 + Ym,n-1 + Ym,n)/4 \quad (1)$$

That is, the pixel is displayed in the gradation given by the average of a gradation signal Ym,n indicating a gradation to be displayed at present and three previous gradation signals Ym,n−3, Ym,n−2 and Ym,n−1. Rearranging equation (1) yields $$Ym,n = 4 \cdot Zm,n - Ym,n-1 - Ym,n-2 - Ym,n-3 \quad (2)$$

It will be understood from equation (2) that the present pixel is displayed in a gradation indicated by the gradation indicating signal Ym,n if the segment electrode Ym is supplied with the difference between a signal quadruple to the average gradation signal "Zm,n" which was applied to the segment electrode in the prior art and the sum of the gradation indicating signals "Ym,n−1", "Ym,n−2", and "Ym,n−3" which were applied 1H, 2H, and 3H before.

Figure 4:
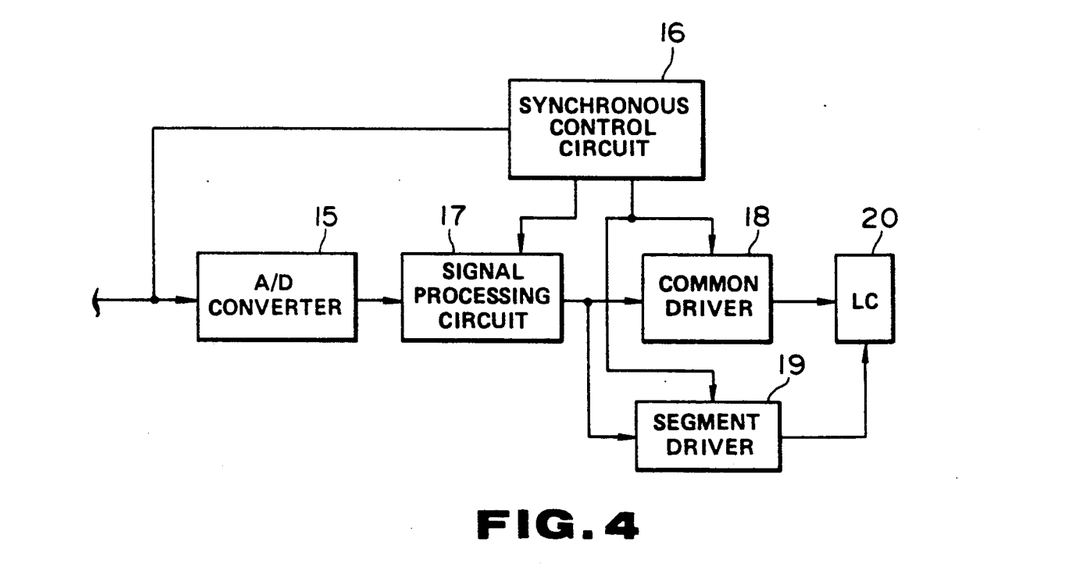
FIG. 4 is a block diagram of a liquid-crystal display according to an embodiment of the present invention.
Figure 5:
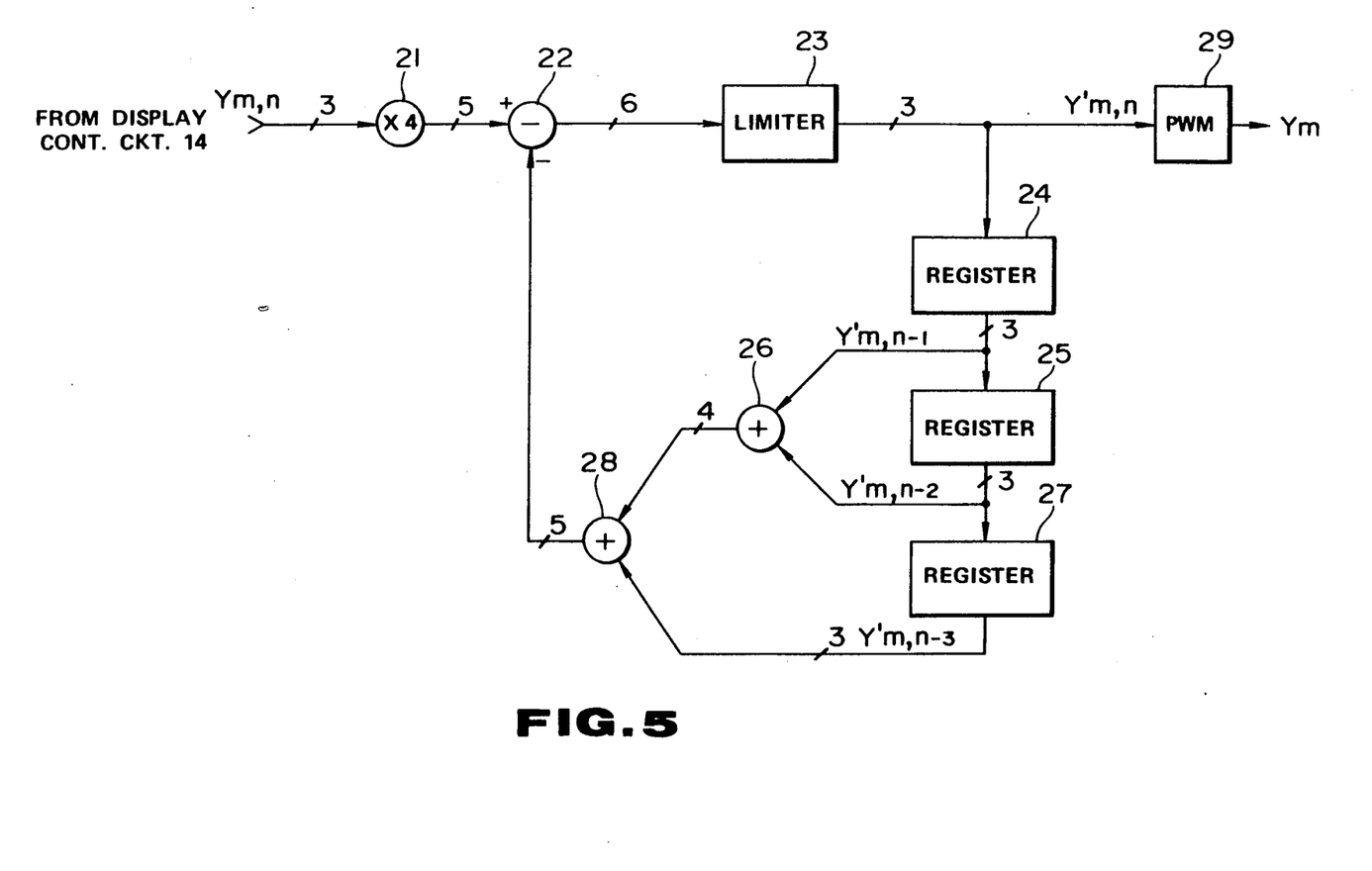
FIG. 5 shows a practical arrangement of the signal processing circuit and the segment driver of FIG. 4.

Referring now to FIGS. 4 and 5, an example of the circuit arrangement of the liquid-crystal display utilizing the above principle of operation will be described. The arrangement of the entire liquid-crystal display will be described first with reference to FIG. 4.

An analog video input signal received and demodulated by a receiver (not shown) is applied to an analog-to-digital (A/D) converter 15 and a synchronous control circuit 16. A/D converter 15 quantizes the input video signal into N×M pixels for application to a signal processing circuit 17. Signal processing circuit 17 contains a line memory, an operation circuit, and so on, and responds to a synchronizing signal from synchronous circuit 16, to process a digital signal from A/D converter 15 and apply the processed digital signal to a common driver 18 and a segment driver 20. Drivers 18, 19 operate in synchronization with synchronizing signals from synchronous circuit 16, to apply segment drive signals and common drive signals to segment electrodes and common electrodes, respectively, of a liquid-crystal display panel 20, thereby to display images.

Next, a practical arrangement of signal processing circuit 17 and segment driver 19 will be described, with reference to FIG. 5, which in particular, shows a circuit for segment electrode Ym of gradation signal processing circuits provided for the respective segment electrodes. In FIG. 5, each of the figures on signal lines represents the number of bits of a signal transmitted over the corresponding signal line. A 3-bit gradation indicating signal (data) Ym,n (indicating the desired gradation to be displayed) supplied from A/D converter 15 of FIG. 4 is quadrupled by a multiplier 21. Multiplier 21 is formed of a shift register designed to shift an input signal by two bits, and provides a 5-bit signal which is changed to a 6-bit signal, by a subtracter 22, for application to a limiter 23. Limiter 23 changes a 6-bit signal applied thereto to a signal Y'm,n which is equal in its number of bits (e.g. 3 bits) to the gradation indicating signal, for application to a pulse-width modulator (PWM) 29. PWM 29 provides a voltage signal with a pulse width corresponding to the input signal Y'm,n to the corresponding segment electrode Ym as a segment drive signal. It is to be noted that PWM 29 can be replaced with a pulse-amplitude modulator (PAM).

An output signal of limiter 23 is also applied to a register 24. Register 24 holds the input signal Y'm,n for the time of one horizontal line, i.e., "1H" period of the liquid-crystal panel, and then applies it to a register 25 and an adder 26. As is the case with register 24, register 25 holds an input signal for a "1H" period and then applies it to a register 27 and an adder 26. Register 27 also holds an input signal for a "1H" period and then applies it to adder 28. In other words, each of registers 24, 25, and 27 operates as a 1H delay line, so that when the gradation indicating signal Ym,n is applied to multiplier 21, the output signal of shift register 24 is Y'm,n−1 delayed by a 1H period, the output signal of register 25 is a 2H-delayed Y'm,n−2 and the output signal of register 27 is a 3H-delayed Y'm,n−3. Adder 26 adds the signals Y'm,n−1 and Y'm,n−2 and delivers the sum to adder 28, as a 4-bit signal. Adder 28 adds the sum signal Y'm,n−1+Y'm,n−2 from adder 26 and the signal Y'm,n−3 from register 27 and then applies the sum Y'm,n−1+Y'm,n−2+Y'm,n−3 to the minus input of subtracter 22, as a 5-bit signal. Subtracter 22 then subtracts the signal Y'm,n−1+Y'm,n−2+Y'm,n−3 from the quadrupled gradation indicating signal 4Ym,n from multiplier 21 and then applies the difference signal to limiter 23. Limiter 23 limits a 6-bit gradation signal to a 3-bit signal like the input signal Ym,n to the processing circuit, and limits an input signal of 6 bits, which represents a numeric value of 8 or more, to a signal of 3 bits representing 7, and an input signal of 6 bits of a negative value to a signal of 3 bits representing 0. The reason for doing this is to prevent an excess in the number of bits of an output signal of the processing circuit over that of an input signal thereof, which would arise when an output signal value of subtracter 22 is 8 or more, and the inability to drive the liquid-crystal panel, which would arise from a negative output value of subtracter 22. However, the operation of the limiter need not be limited to that described above. Any other limiter may be used, so long as it provides 3-bit outputs. For example, only the 3 highest bits of an applied signal may be extracted.

The output signal of the limiter 23 is applied to PWM 29 and PWM 29 supplies a segment drive signal to corresponding segment electrode Ym. Hence, the signal Y'm,n which is the quadrupled signal of the input gradation indicating signal Ym,n minus the sum of the drive signals applied to the segment electrode Ym just before, i.e. Y'm,n−1+Y'm,n−2+Y'm,n−3, is applied to segment electrode Ym.

Next, the operation of the above embodiment will be described, with reference to FIGS. 6 and 7.

Figure 6:
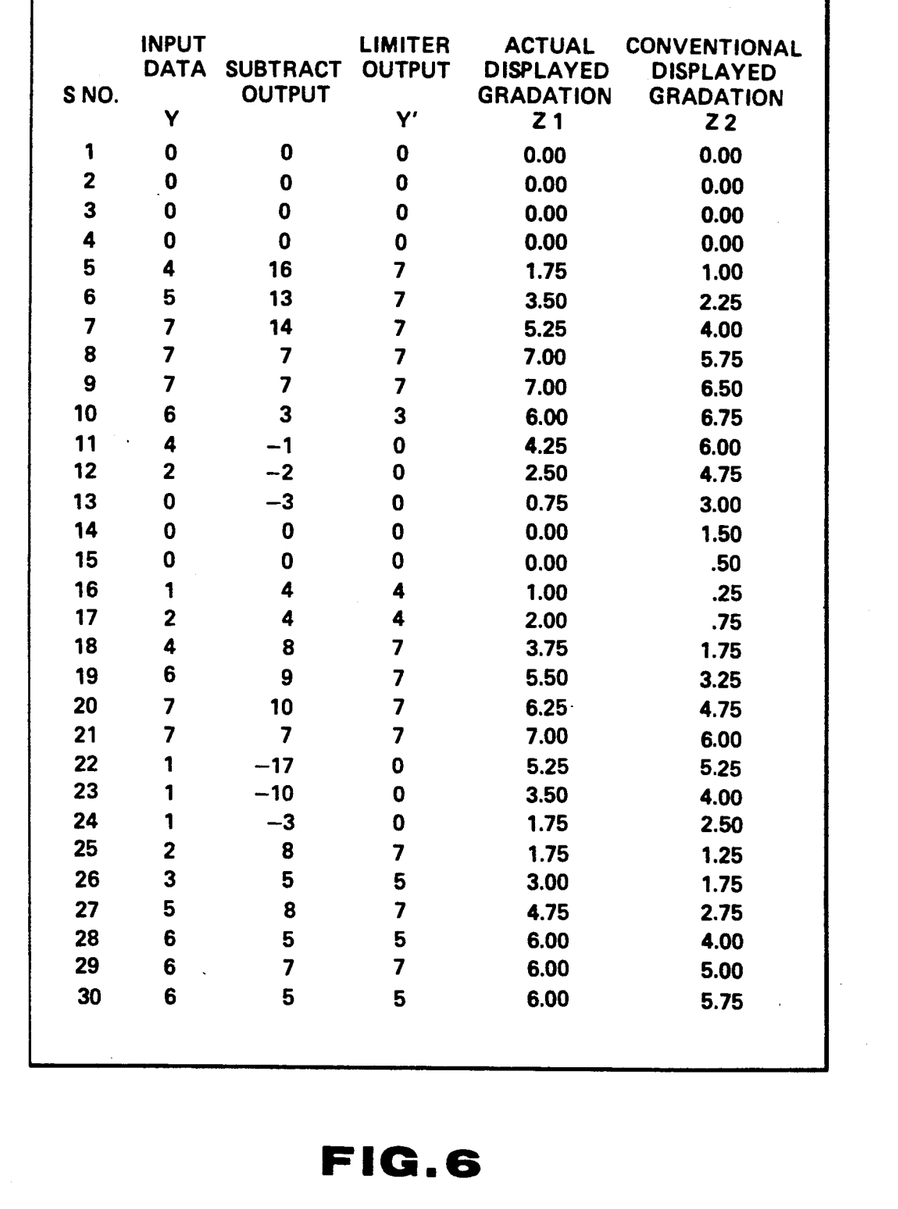
FIG. 6 is a table for explaining the operation of the circuit arrangement of FIG. 5.

FIG. 6 shows the relationships of outputs of subtracter 22, outputs Y' of limiter 23, actual display gradations Z1 of pixels, and display gradations Z2 according to the prior art (FIGS. 3A through 3E), and which are obtained when concrete data is continuously applied as gradation indicating signal Y'. For example, in the case of input data of serial No. 26 of FIG. 6, the gradation indicating signal Ym,n is 3 and the desired display gradation is 3. On the other hand, the signal Y'm,n−1 held in register 24 is 7, the signal Y'm,n−2 held in register 25 is 0, and the signal Y'm,n−2 held in register 27 is 0. Thus, the signal actually applied to PWM 29 becomes 5, so that the gradation actually displayed becomes (Y'm,n+Y'm,n−1+Y'm,n−2+Y'm,n−3)/4=(5+7+0+0)/4=3. This is in agreement with the desired gradation which is specified by the gradation indicating signal. In contrast thereto, the display gradation according to the prior art driving method becomes 1.75, which is much lower than the desired gradation.

Figure 7:
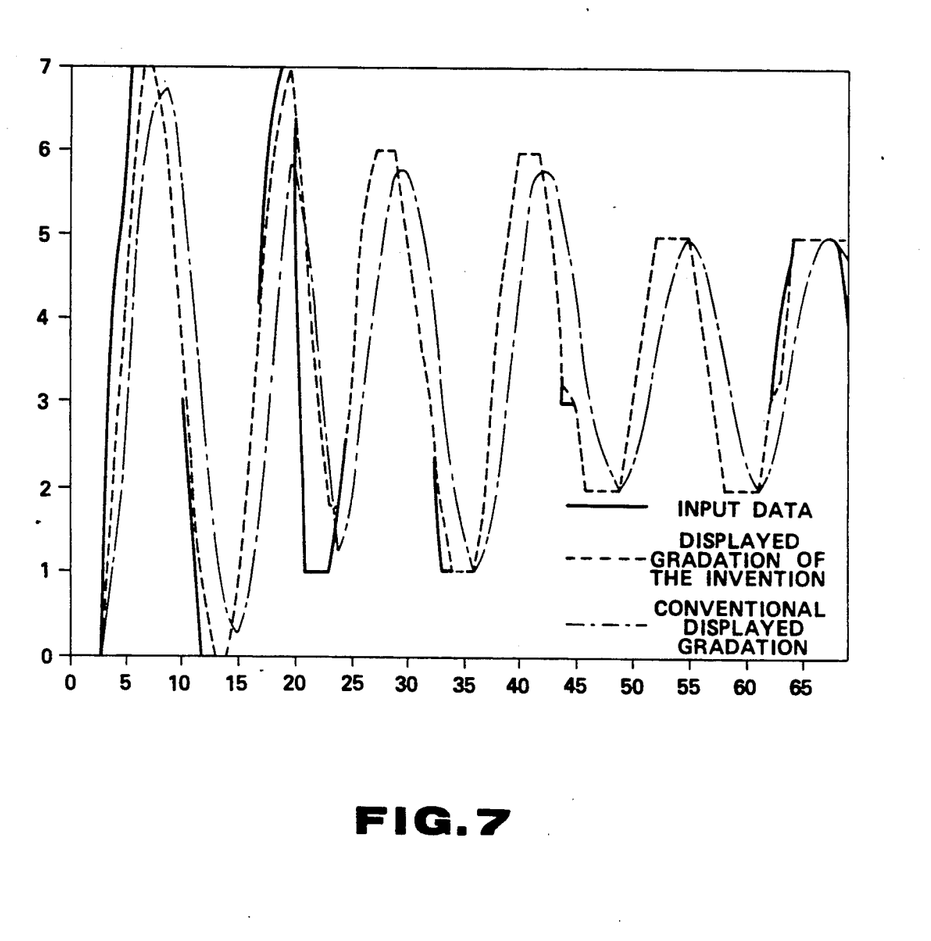
FIG. 7 is a chart of the table of FIG. 6.

FIG. 7 shows a graph illustrating the relationships of FIG. 6, in which the gradation indicated by the gradation indicating signal is denoted by a solid line, the gradation displayed in this embodiment is denoted by a broken line, and the gradation displayed by the prior art is denoted by a dot-dash-line. As will be clear from FIG. 7, in contrast to the gradations Z2 according to the prior art, the gradations Z1 according to the embodiment approximate (or are exactly the same as) the gradations defined by the gradation indicating signals Y in most cases. It should be noted that, in parts of FIG. 7 in which the gradations Z1 equal the gradations defined by the gradation indicating signals Y, for example, in parts corresponding to serial Nos. 8-10, 14-17 and so on, the solid line indicating the gradations defined by the gradation indicating signals Y is omitted to prevent the solid line from being superimposed on the broken line.

According to the embodiment, as described above, since a gradation signal processed to exclude the influence of gradation signals inherently intended for adjacent pixels is applied to a segment electrode, high-resolution images can be displayed without a lowering of contrast.

A second embodiment of the present invention will be described next.

To solve the above-mentioned low contrast problem, the second embodiment is arranged to (1) subtract a signal obtained by attenuating a signal previously applied to a segment electrode from a gradation indicating signal, for subsequent application of the resultant difference signal to the segment electrode and (2) attenuate the effective value of a signal to be applied to a common electrode, in accordance with the degree of attenuation of the signal applied to the segment electrode, for subsequent application to the common electrode.

The arrangement of a liquid-crystal display according to the second embodiment is entirely the same as that of FIG. 4.

Figure 8:
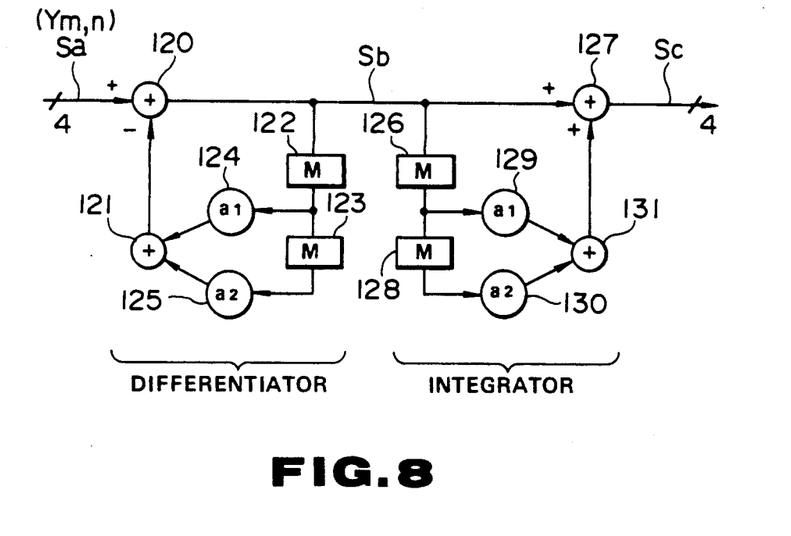
FIGS. 8, 9, and 14 are block diagrams illustrating the operational principle of a liquid-crystal display according to a second embodiment of the invention.

The principle of the signal processing according to the second embodiment will be described next, with reference to FIG. 8. A differentiator of FIG. 8 corresponds to signal processing circuit 17 of FIG. 4. An integrator simulatively shows the optical response function of the liquid-crystal display, so as to explain the role of the differentiator, and corresponds to common driver 19 and display panel 20 of FIG. 4. In FIG. 8, a gradation indicating signal Sa (this is a signal indicating a desired gradation for display and corresponds to Ym,n of FIG. 5) of 4 bits, for example, is applied to a subtracter 120. Subtracter 120 subtracts an output signal of an adder 121 from the gradation indicating signal Sa, and an output signal of subtracter 120 is delivered to a line memory 122 and to the integrator, as an output signal Sb of the differentiator. Signal Sb corresponds logically to a segment driving signal applied to a segment electrode. After being temporarily held in line memory 122, the output signal of subtracter 120 is applied to a line memory 123 and a multiplier 124. Line memory 123, like line memory 122, also temporarily holds a signal applied thereto and then outputs the signal to a multiplier 125. Multiplier 124 multiplies its input signal by a fixed coefficient α1 and applies the product to adder 121. Likewise, multiplier 125 multiplies its input signal by a fixed coefficient α2, for subsequent application to adder 121. The fixed coefficients α1 and α2 are related such that $0 < \alpha2 \leq \alpha1 \leq 1$. Thus, multipliers 124, 125 both operate as attenuators. An output signal of adder 121 is applied to the minus input of subtracter 120.

As described above, the integrator simulatively illustrates the optical response function of the liquid-crystal display. In general, the display gradation (the degree of brightness of each pixel due to electrooptic effect) of each pixel depends on the effective value of the voltage applied to the liquid crystal at the each pixel and is roughly proportional to an accumulated value of products of instantaneous voltages applied between electrodes and the time of application thereof. In other words, the gradation of each pixel is proportional to a value obtained by integrating the applied voltage with respect to time. Thus, the liquid-crystal display can be considered to be an integrator, with the instantaneous voltage value taken as its input and the pixel gradation as its output.

In FIG. 8, the output signal Sb (corresponding to the voltage applied to the liquid-crystal material) of the differentiator is delivered to a line memory 126 and an adder 127 of the integrator. Line memory 126 temporarily holds the signal applied thereto and then outputs it to a line memory 128 and a multiplier 129. Line memory 128 also temporarily holds the signal applied thereto, for subsequent application to a multiplier 130. Multiplier 129 multiplies the signal applied thereto by the same fixed coefficient $\alpha 1$ as used by multiplier 124, for subsequent application to adder 131, and multiplier 130 multiplies the signal applied thereto by the same fixed coefficient $\alpha 2$ as used by multiplier 125, for subsequent application to adder 131. The output signal of adder 131 is then applied to adder 127; that is to say, the output signal of adder 127 corresponds to a signal which is obtained by adding together the latest three values of output signal Sb of the differentiator under the fixed attenuating factors, and is used as an output signal of the integrator and corresponds to the influence of the voltage applied the liquid-crystal material in the actual liquid-crystal display, or the gradation of a displayed pixel.

Referring to FIG. 8, a pair of corresponding line memories 122, 126; and 123, 128 always hold the same signal value, and hence, the outputs of adders 121 and 131 also have an equal value. Thus, no signal loss theoretically will occur between the gradation indicating signal Sa serving as an input signal and the gradation Sc serving as an output signal, with the result that the gradation of the displayed pixel will agree with the gradation indicated by the gradation indicating signal Sa.

As will be understood from the foregoing, in the case of the time-division driving method in which a plurality of common electrodes are selected simultaneously, each pixel will be displayed having a desired gradation defined by the gradation indicating signal Sa, provided that (1) signals previously applied to signal electrodes are attenuated, (2) the attenuated signals are subtracted from the gradation indicating signal Sa, (3) a signal resulting from the subtraction is applied to a segment electrode as a segment drive signal, and (4) the influence of a segment drive signal previously applied to the segment electrode upon the liquid-crystal panel is lessened in some way.

Multiplying the delayed signals by the fixed coefficients $\alpha 1$, $\alpha 2$ in multipliers 124, 125, and 129, 130 is to prevent the level of output signal Sb of the differentiator from varying considerably for stabilization of the value of signal Sb.

Figure 9:
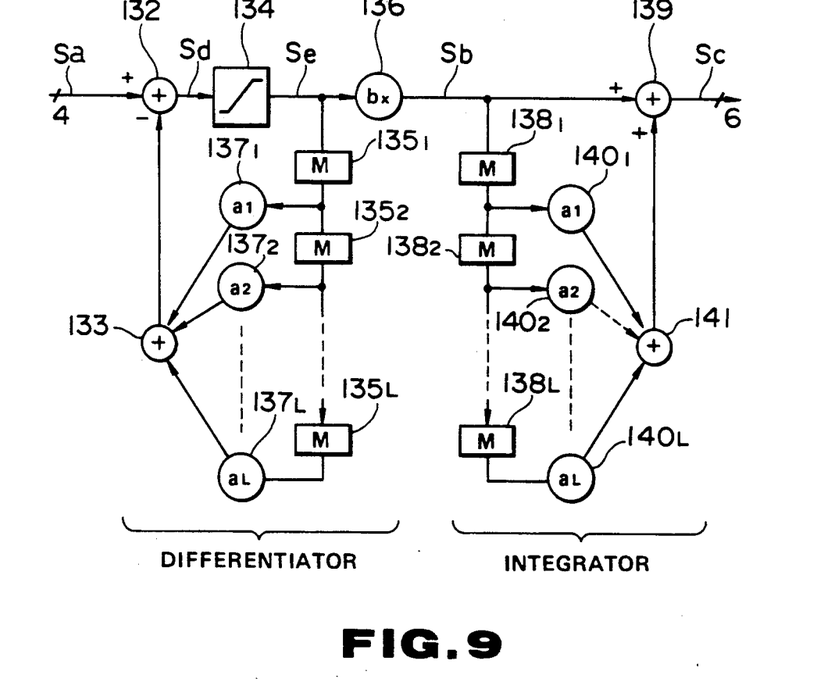

Two-stage line memories (122, 123; 126, 128) are used to explain the principle of this invention in FIG. 8. Reference is now made to FIG. 9 to explain the principle of this invention by the use of more general multistage line memories.

In the differentiator of FIG. 9, a subtracter 132 subtracts an output signal of an adder 133 from gradation indicating signal Sa and delivers its output signal Sd to a limiter 134. Limiter 134 performs the same function as limiter 23 of FIG. 4 and clips output signal Sd of subtracter 132 when it has more than a predetermined number of bits. An output signal Se of limiter 134, which may be a bit-limited signal, is applied to a line memory $135_1$ and a multiplier 136, and an output signal of line memory $135_1$ is applied to line memories $135_2$, $135_3$, ..., $135_L$ in sequence. Output signals of line memories $135_1$–$135_L$ are applied to multipliers $137_1$–$137_L$, which multiply the signals applied thereto by the respective fixed coefficients $\alpha 1$ - $\alpha 1$, and apply the resultant outputs to an adder 133—the fixed coefficients $\alpha 1$–$\alpha L$ are related such that $0 < \alpha L \leq \ldots \leq \alpha 2 \leq \alpha 1 \leq 1$—and the output of adder 133 is coupled to the minus input of subtracter 132.

Multiplier 136 multiplies the output signal of limiter 134 by a fixed coefficient bx. Since $bx > 1$, multiplier 136 thus functions as an amplifier. The reason multiplier 136 is used for this purpose is that the average value of output signal Sd of subtracter 132 becomes $$1 / \left( 1 + \sum_{n=1}^{L} \alpha n \right)$$

times the average value of input signal Sa and thus requires amplification.

Output signal Sb of amplifier 136 is applied to a line memory $138_1$ and an adder 139, and an output signal of line memory $138_1$ is applied to line memories $138_2$, $138_3$, ..., $138_L$ in sequence. Output signals of line memories $138_1$–$138_L$ are applied to multipliers $140_1$–$140_L$, which multiply the signals applied thereto by the respective fixed coefficients $\alpha 1$–$\alpha L$ and apply the resultant outputs to an adder 141, which in turn feeds an output signal of adder 141 is fed to adder 139. An output signal of adder 139 serves as an output signal Sc of the integrator, and since the integrator processes a signal which has been amplified by a factor of bx by multiplier 136, the output signal Sc of the integrator becomes bx times the output signal of the integrator of FIG. 8.

Limiter 134 is designed to cause output signal Sb of the differentiator to fall within a predetermined bit range. Input signals to adders 141, 139 correspond to a voltage value which is applied to one pixel of liquid-crystal panel by liquid-crystal driver 118, and since the allowable input range of each adder is limited, the output range of limiter 134 is therefore set to 1/bx of the allowable input range of adder 139. Whether or not limiter 134 actually clips input signal Sd depends on the sequence of input signal Sa of the differentiator and the fixed coefficient $\alpha n$ of multiplier $137_n$—the greater amplitude of input the high-frequency component of signal Sa, and the greater the value of $\Sigma \alpha n$, the higher i the probability of clipping. When the clipping is performed, some signal loss occurs, degrading the picture quality of a displayed image. Therefore, it is necessary to determine the fixed coefficient $\alpha n$ of multiplier $137_n$ by taking the characteristics of input signal Sa into consideration.

Figure 10:
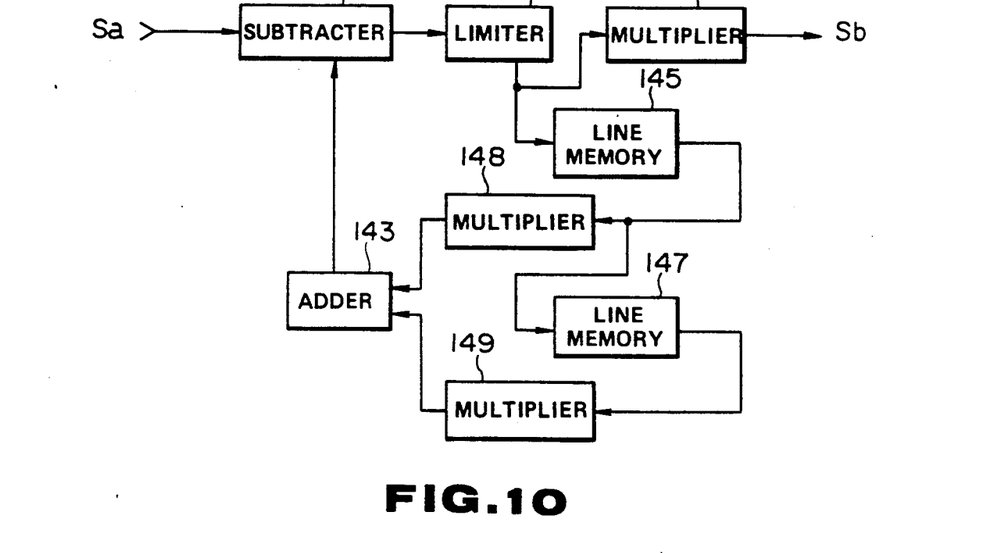
FIG. 10 is a block diagram of the signal processing circuit of the second embodiment.

Referring now to FIGS. 10 and 11, a signal processing circuit for implementing the method for driving the liquid-crystal display, which method will be understood from FIGS. 8 and 9, will be described.

FIG. 10 shows an arrangement of the segment signal processing circuit for processing a gradation indicating signal to produce a segment drive signal. The circuit of FIG. 10 corresponds to the differentiator of FIGS. 8 and 9, and is provided for each of the segment electrodes. A subtracter 142 receives a gradation indicating signal Sa, indicating a gradation of a displayed pixel, from A/D converter 15 of FIG. 4, and subtracts an output signal of an adder 143 from gradation indicating signal Sa and then applies its output signal to a limiter 144. Limiter 144 clips the output signal of subtracter 142 when it has more than a predetermined number of bits, and supplies an output signal to a line memory 145 and a multiplier 146. Multiplier 146 multiplies the signal supplied from 142 by fixed coefficient bx, fixed coefficient bx is set to bx>1, multiplier 146 thus operates as an amplifier. An output signal Sb of multiplier 146 is applied to PWM 29 of FIG. 5, for conversion to an analog segment drive signal, which is then supplied to a segment electrode of liquid-crystal display panel 29.

An output signal of line memory 145 is sent to a line memory 147, and to multiplier 148, and a output signal of line memory 147 is applied to multiplier 149. Multipliers 148 and 149 multiply the signals applied thereto by the respective fixed coefficients $\alpha1$ and $\alpha2$ and apply their outputs to an adder 143—fixed coefficients $\alpha1$ and $\alpha2$ are related such that $0<\alpha2\leq\alpha1\leq1$—and adder 143 adds the signals input thereto and applies an output signal to subtracter 142, as a subtrahend input.

Figure 11A:
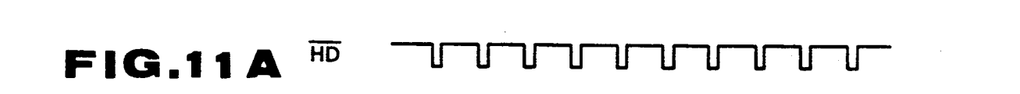
FIGS. 11A through 11E and FIGS. 15A through 15E are timing diagrams for illustrating voltages applied to common electrodes.
Figure 11B:
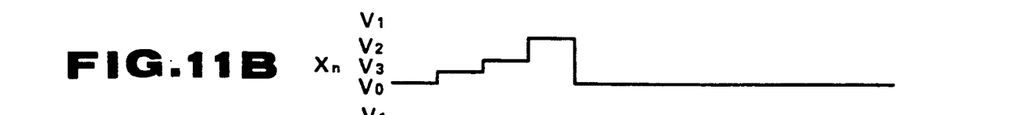
Figure 11C:
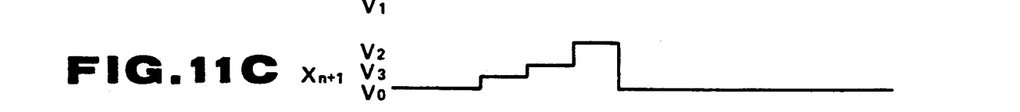
Figure 11D:
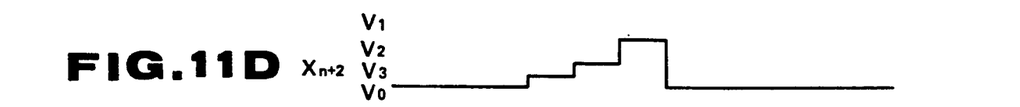
Figure 11E:
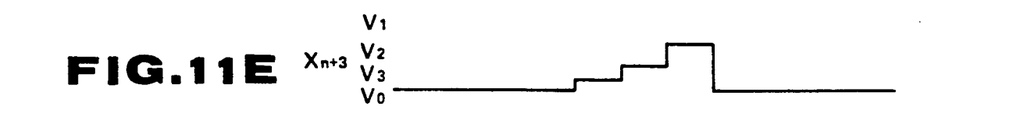

In the integrator of FIGS. 8 and 9, common driver 18 supplies a common electrode with such a signal as to lessen the influence of previously supplied segment drive signals. In this embodiment, common driver 18 supplies common electrodes with voltages having such waveforms as shown in FIGS. 11B through 11E. FIG. 11A shows a horizontal synchronizing signal $\overline{HD}$ which specifies the timing of application of segment drive signals to segment electrodes. In FIGS. 11B through 11E, the voltage applied to a segment electrode, when it is not selected, is set to V0, while the voltage applied to the segment when it is selected is set to V1. Further, a voltage V2 is applied to the common electrode one timing step before the time of selection of the common electrode, and a voltage V3 is applied to the common electrode two timing steps before the time of selection of the common electrode. V2 and V3 are expressed by using fixed coefficients $\alpha1$ and $\alpha2$ as follows:

$$V2 = \alpha1 \times (V1 - V0) + V0$$

$$V3 = \alpha2 \times (V1 - V0) + V0$$

If such voltages are applied to common electrodes, the influence of a gradation signal applied to a certain common electrode one timing step before the time of selection of the common electrode will become $\alpha1$ times, while the influence of a gradation signal two timing steps before will become $\alpha2$ times. Thus, such integration circuits as are shown in FIGS. 8 and 9 can be realized.

To generate such signals as shown in FIGS. 11A through 11E, a voltage select signal for one common electrode may be formed of two bits so that one of voltages V0, V3, V2 and V1 may be selected.

Figure 12:
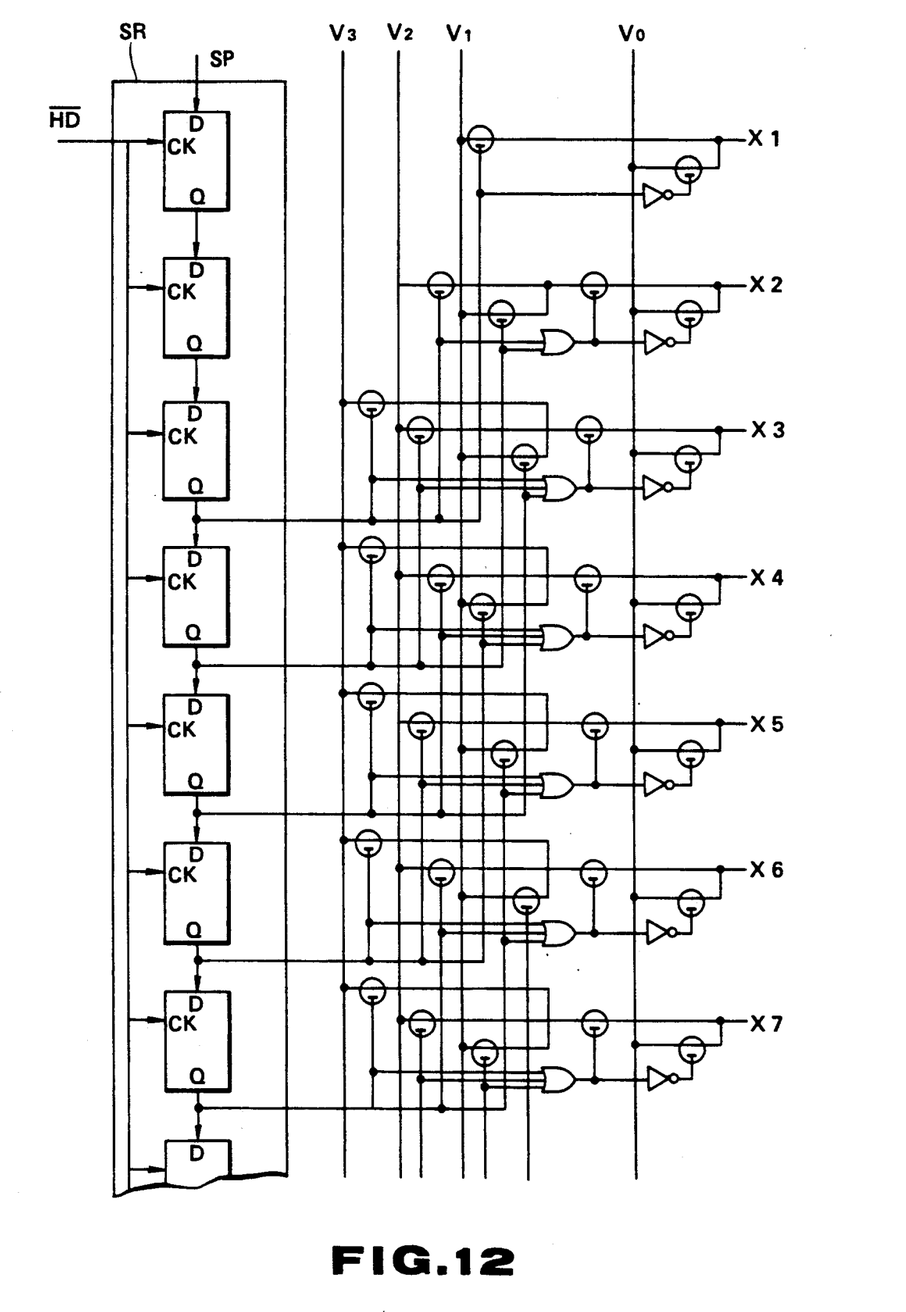
FIG. 12 is a circuit diagram of a circuit designed to generate common driving signals.
Figure 13A:
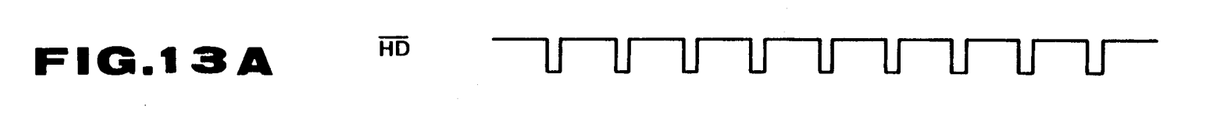
FIGS. 13A through 13G are timing diagrams which are useful in understanding the operation of the circuit shown in FIG. 12.
Figure 13B:
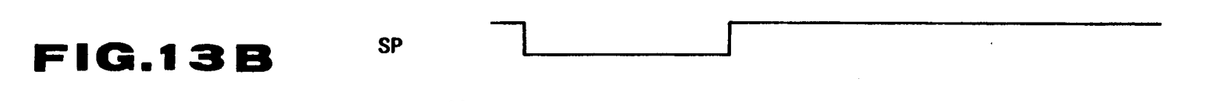
Figure 13C:
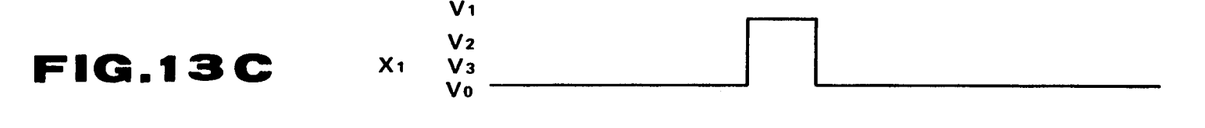
Figure 13D:
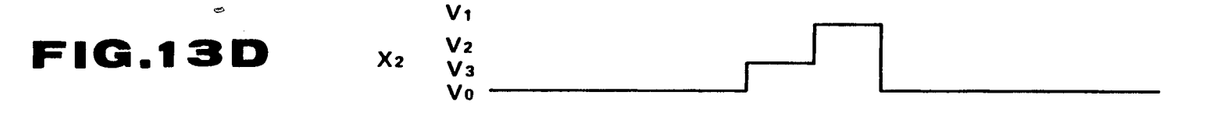
Figure 13E:
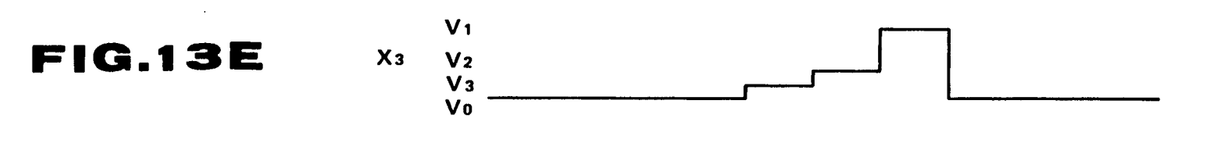
Figure 13F:
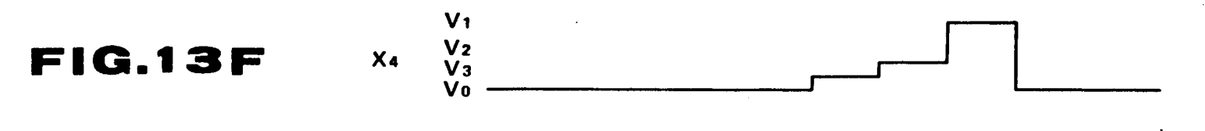
Figure 13G:
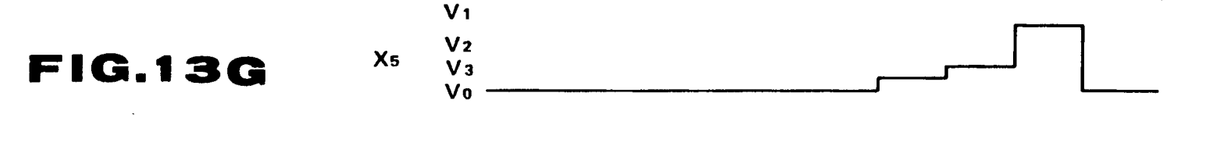

An arrangement of the common electrode driver will be described with reference to FIG. 12. A shift register SR is formed of series-connected D-type flip-flops. Horizontal synchronizing signal $\overline{HD}$ is applied to a clock input CK of each flip-flop. Connected between shift register SR and common electrodes X1-Xn is gate circuits GC to which voltages V3, V2, V1 and V0 are applied. Gate circuit GC responds to output signals of shift register SR to selectively apply voltages V3-V0 to the common electrodes.

The operation of the gate circuit of FIG. 12 will be described with reference to FIGS. 13A through 13G. When a start pulse SP (FIG. 13B) is applied to the shift register during the three clocks of the horizontal synchronizing signal $\overline{HD}$ (FIG. 13A), a signal "1" is held in each of the first three flip-flops of the shift register. In response to the output signals of shift register SR, gate circuit GC applies voltage V1 to common electrode X1, voltage V2 to common electrode X2 and voltage V3 to common electrode X3. In response to the next clock of the horizontal synchronizing signal, the signal "1" is shifted to the second, third and fourth flip-flops. As a result, gate circuit GC applies voltage V1 to common electrode X2, voltage V2 to common electrode X3 and voltage V3 to common electrode X4. The same operation is repeated afterwards.

In FIGS. 8, 9 and 10, a plurality of line memories are used. From the standpoint of the circuit arrangement, however, an increase of the line memories in number will lead to an increase in the system cost. Accordingly, another embodiment of the present invention in which the differentiator is arranged to use only one line memory and yet has the same advantage as the arrangements in FIGS. 8, 9 and 10 will be described with reference to FIG. 14.

Figure 14:
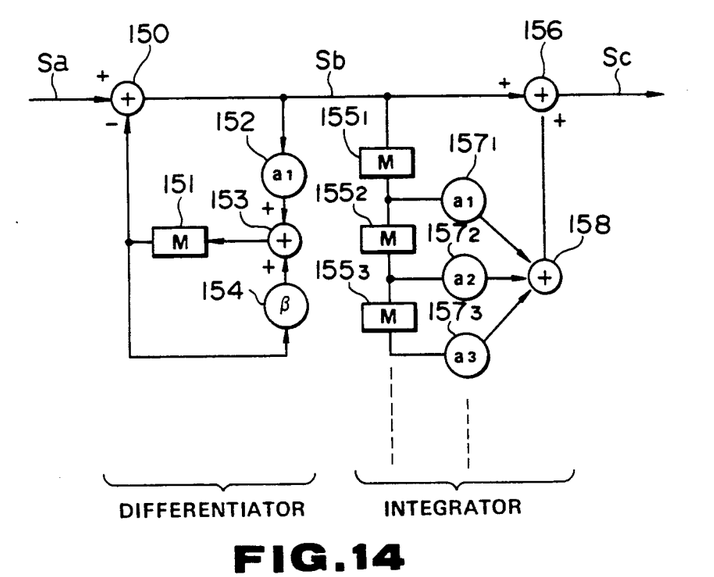
Figure 15A:
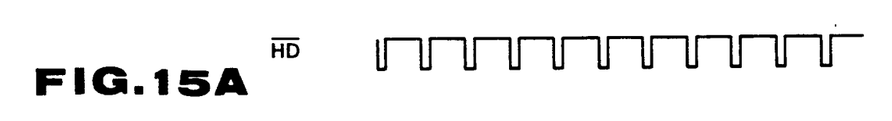
Figure 15B:
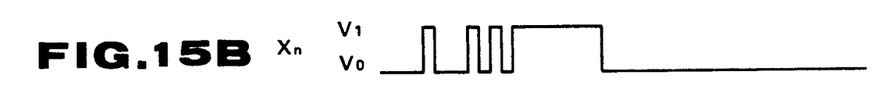
Figure 15C:
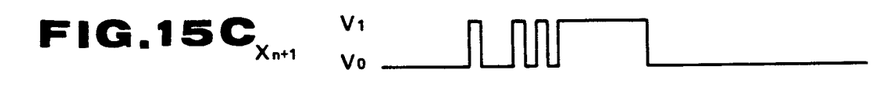
Figure 15D:
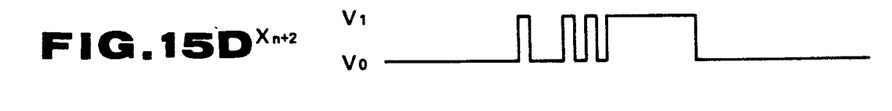
Figure 15E:
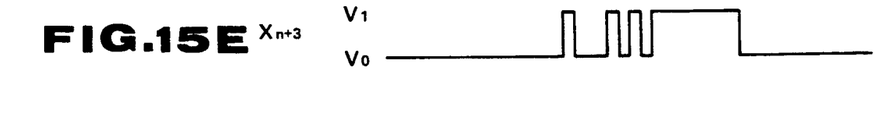

A subtracter 150 subtracts an output signal of a line memory 151 from gradation indicating signal Sa. An output signal of subtracter 150 is applied to a multiplier 152 and to the integrator as output signal Sb of the differentiator. Multiplier 152 multiplies the applied signal by fixed coefficient $\alpha1$ for subsequent application to an adder 153. An output signal of adder 153 is delivered to line memory 151. An output signal of line memory 151 is applied to a multiplier 154 as well as subtracter 150. Multiplier 154 multiplies the signal applied thereto by a fixed coefficient $\beta$ and outputs the resultant output signal to adder 153. Here fixed coefficients are such that $0<\alpha1\leq1$ and $0<\beta\leq1$. After being delayed by line memory 151, the output signal of adder 153 is applied to subtracter 150 and multiplier 154. The output signal of multiplier 154 is input to adder 153. With such an arrangement, the same advantage as that in the arrangements of FIGS. 9 and 10 will result notwithstanding the use of only one line memory 151.

The integrator corresponding to the differentiator of FIG. 14 will have such an arrangement as shown on the right-hand side of FIG. 14. Signal Sb is sent to a line memory $155_1$ and an adder 156. An output signal of line memory $155_1$ is sent to line memories $155_2$, $155_3$, ... in sequence. Output signals of line memories $155_1$, $155_2$, ... are applied to multipliers $157_1$, $157_2$, ..., respectively. Multipliers $157_1$, $157_2$, ... multiply signals applied thereto by the respective fixed coefficients $\alpha1$, $\alpha2$, ..., and apply the resultant outputs to adder 158. An output signal of adder 158 is applied to adder 156 whose output signal is used as output signal Sc of the integrator.

In the arrangement of FIG. 14, to eliminate the loss between input signal Sa and output signal Sc, it is required that the output signals of line memory 151 and adder 158 be equal to each other. To meet such a requirement, the integrator must be provided with an infinite number of line memories and multipliers, and fixed coefficients $\alpha n$ ($n \geq 2$) must be such that $\alpha n = \alpha n - 1 \times \beta$. In practice, however, if the minimum fixed value $\alpha n$ is to a certain extent small (about 0.1), the signal loss will be negligible and there will scarcely be any image degradation due to errors.

A circuit for achieving the principle of operation of FIG. 14 can be constructed like the circuits of FIGS. 10 and 11.

In FIGS. 11B through 11E and FIGS. 13A through 13G, the common signals have a stair-step waveform. As described above, however, since the influence of the electrooptic effect upon the liquid-crystal display element depends on the effective value of an applied voltage, the apply time of the common signal may be adjusted. FIGS. 15A through 15E illustrate the state in which the effective value of a voltage applied to a common electrode is changed in four steps between V0 and V1 by controlling the pulse width (the number of unit pulses per clock period). FIGS. 15A through 15E show the case where three line memories are connected and fixed coefficients $\alpha1$–$\alpha3$ are set such that $\alpha1=1$, $\alpha2=0.5$ and $\alpha3=0.2$.

As described above, according to the second embodiment, (1) a signal obtained by attenuating a segment signal which is to be inherently applied to an adjacent pixel is subtracted from a gradation indicating signal; (2) a signal resulting from the subtraction is applied to a segment electrode; (3) when the segment signal which is inherently for the adjacent pixel is applied, a voltage for a common electrode is made to have a value corresponding to the degree of attenuation of the segment signal and applied to the common electrode. Hence a time-division liquid-crystal driver and driving method capable of displaying high-contrast and high-resolution images can be provided.

In the above embodiment, the effective value of a voltage applied to a common electrode is changed stepwisely. Alternatively, the effective value may be changed in a slope.

The present invention relates to a liquid-crystal driving method in which a plurality of common electrodes are driven simultaneously. According to the usual scanning method, the simultaneously driven common electrodes are adjoining k ($\geq 2$) electrodes. In the case of the interlaced scanning, however, the simultaneously driven common electrodes may be common electrodes which are driven before and after.

Although a few embodiments of the invention have been disclosed and described, it is apparent that other embodiments and modification of the invention are possible.

What is claimed is:

1. A liquid-crystal display comprising:
liquid-crystal display means having a plurality of common electrodes and a plurality of segment electrodes intersecting said common electrodes, the display means being responsive to signals applied to said common and segment electrodes, to display an image comprised of a plurality of pixels;
display control means for generating gradation indicating signals for indicating a display gradation of each of said pixels of said liquid-crystal display means;
common driving mean coupled to said common electrodes for simultaneously scanning k common electrodes, where k is an integer of at least 2; and
segment driving means provided for each of said segment electrodes and coupled to a corresponding segment electrode and to said display control means, for multiplying a corresponding gradation indicating signal by k, subtracting the sum of (k−1) signals applied immediately before to said corresponding segment electrode from the gradation indicating signal multiplied by k, to produce a difference signal, and for supplying the difference signal to said segment electrode.

2. A liquid-crystal display according to claim 1, wherein said segment driving means comprises: multiplying means for multiplying the gradation indicating signal by k; holding means for holding a series of (k−1) signals applied immediately before to said segment electrodes; adding means for obtaining the sum of the (k−1) signals held by said holding means; subtracting means for subtracting an output signal of said adding means from an output signal of said multiplying means; and supply means for supplying an output signal of said subtracting means to said corresponding segment electrode.

3. A liquid-crystal display according to claim 2, wherein said display control means generates the gradation indicating signal in digital form, said multiplying means, said holding means, said adding means, and said subtracting means process a digital signal, and said supply means converts an output digital signal of said subtracting means to an analog signal for application to said corresponding segment electrode.

4. A liquid-crystal display according to claim 2, wherein said holding means comprises series-connected (k−1) memories, each of said memories storing an input signal for one scanning interval and outputting the stored signal after the lapse of one scanning interval; and wherein said adding means obtains the sum of output signals of said (k−1) memories.

5. A liquid-crystal display according to claim 2, further comprising limiter means connected between said subtracting means and said supply means, for limiting the output signal of said subtracting means to be within a predetermined signal range.

6. A liquid-crystal display comprising:
liquid-crystal display means having a plurality of common electrodes and a plurality of segment electrodes intersecting said common electrodes, the display means being responsive to signals applied to said common and segment electrodes, to display an image composed comprised of a plurality of pixels;
display control means for generating a gradation indicating signal for indicating a display gradation of each of said pixels of said liquid-crystal display means;
segment driving means provided for each of said segment electrodes, for attenuating each of a series of signals applied immediately before to a corresponding segment electrode, adding attenuated signals to obtain a sum signal, subtracting the sum signal from the gradation indicating signal to obtain a difference signal, and applying the difference signal to said segment electrodes as segment driving signals; and
common driving means for simultaneously selecting more than one common electrode to be scanned and for attenuating signals to be applied to selected common electrodes, in correspondence to the degree of attenuation of the signals applied to said segment electrodes for application to said selected common electrodes as common driving signals, so as to decrease on displayed pixels the effect of signals previously applied to said segment electrodes.

7. A liquid-crystal display according to claim 6, wherein said common driving means simultaneously selects n which is (an integer of at least 2) common electrodes for scan, and applies to each of said common electrodes, when selected, a signal whose effective value increases gradually or stepwisely with time.

8. A liquid-crystal display according to claim 6, wherein said segment driving means comprises: first storage means for holding the signal applied to said corresponding segment electrode during the last scan interval; second storage means for holding the signal applied to said corresponding segment electrode during the second last scan interval; first attenuating means for attenuating an output signal of said first storage means at an attenuating factor A1; second attenuating means for attenuating an output signal of said second storage means at an attenuating factor A2; subtracting means for subtracting output signals of said first and second attenuating means from the gradation indicating signal; and means for supplying output signals of said first and second attenuating means to said corresponding segment electrode, and wherein said common driving means simultaneously selects at least three common electrodes for scan and supplies each of said common electrodes with a voltage of A2·V0 during a first scan interval, a voltage of A1·V0 during a second scan interval, and a voltage of V0 during a third scan interval.

9. A liquid-crystal display according to claim 7, wherein said segment driving means further comprises limiter means for limiting the output signal of said subtracting means to within a predetermined signal range.

10. A liquid-crystal display according to claim 7, wherein said common driving means includes means connected to receive a plurality of different voltages, for sequentially selecting the voltages in increasing voltage order, for application to said common electrodes.

11. A liquid-crystal display according to claim 7, wherein said common driving means includes means for supplying said common electrodes with pulse signals whose substantial pulse widths increase sequentially during scan intervals.

12. A liquid-crystal display comprising:
liquid-crystal display means having a plurality of common electrodes and a plurality of segment electrodes intersecting said common electrodes, the display means being responsive to signals applied to said common and segment electrodes, to display an image comprised of a plurality of pixels;
display control means for generating gradation indicating signals for indicating a display gradation of each of said pixels of said liquid-crystal display means;
driving means coupled to said common electrodes, to said segment electrodes, and to said display control means, for applying signals to said segment electrodes while simultaneously selecting more than one common electrode of said common electrodes, to drive said liquid-crystal display means by supplying common signals to said common electrodes, said driving means including compensating means for supplying compensated signals obtained by compensating the gradation indicating signal to said segment electrodes so as to decrease a difference between a gradation of each pixel indicated by said gradation indicating signal and an actually displayed gradation, the gradation difference resulting from the simultaneous selection of more than one common electrode;
wherein said driving means drives k common electrodes simultaneously, where k is an integer of at least 2, and drives one common electrode k times to cause said liquid-crystal display to display an image;
and said driving means includes means for multiplying the gradation indicating signals by k; for subtracting the sum of (k−1) signals continuously applied to said segment electrodes from the gradation signal multiplied by k; and for applying the resultant difference signal to said segment electrodes.

13. A liquid-crystal display comprising:
liquid-crystal display means having a plurality of common electrodes and a plurality of segment electrodes intersecting said common electrodes, the display means being responsive to signals applied to said common and segment electrodes, to display an image comprised of a plurality of pixels;
display control means for generating gradation indicating signals for indicating a display gradation of each of said pixels of said liquid-crystal display means;
driving means coupled to said common electrodes, to said segment electrodes, and to said display control means, for applying signals to said segment electrodes while simultaneously selecting more than one common electrode of said common electrodes, to drive said liquid-crystal display means by supplying common signals to said common electrodes, said driving means including compensating means for supplying compensated signals obtained by compensating the gradation indicating signal to said segment electrodes so as to decrease a difference between a gradation of each pixel indicated by said gradation indicating signal and an actually displayed gradation, the gradation difference resulting from the simultaneous selection of more than one common electrode;
wherein said driving means includes segment driving means provided for each of said segment electrodes; and
said segment driving means comprising: multiplying means for multiplying a corresponding gradation indicating signal and k, where k is an integer of at least 2; holding means for holding a series of (k−1) signals applied to said segment electrodes; adding means for obtaining the sum of the (k−1) signals held by said holding means; subtracting means for subtracting an output signal of said adding means from an output signal of said multiplying means; and means for applying an output signal of said subtracting means to corresponding segment electrode.

14. A liquid-crystal display comprising:
liquid-crystal display means having a plurality of common electrodes and a plurality of segment electrodes intersecting said common electrodes, the display means being responsive to signals applied to said common and segment electrodes, to display an image comprised of a plurality of pixels;
display control means for generating gradation indicating signals for indicating a display gradation of each of said pixels of said liquid-crystal display means;

driving means coupled to said common electrodes, to said segment electrodes, and to said display control means, for applying signals to said segment electrodes while simultaneously selecting more than one common electrode of said common electrodes, to drive said liquid-crystal display means by supplying common signals to said common electrodes, said driving means including compensating means for supplying compensated signals obtained by compensating the gradation indicating signal to said segment electrodes so as to decrease a difference between a gradation of each pixel indicated by said gradation indicating signal and an actually displayed gradation, the gradation difference resulting from the simultaneous selection of more than one common electrode;

wherein said driving means includes means for attenuating the signals applied to said segment electrodes at a constant attenuating factor; for adding the attenuated signals to produce a sum signal; for subtracting the sum signal from the gradation indicating signal to produce a difference signal; for applying the difference signal to said segment electrodes; and for attenuating a signal to be applied to said common electrodes at an attenuating factor corresponding to the constant attenuating factor for application to said common electrodes.

15. A liquid-crystal display comprising:

liquid-crystal display means having a plurality of common electrodes and a plurality of segment electrodes intersecting said common electrodes, the display means being responsive to signals applied to said common and segment electrodes, to display an image comprised of a plurality of pixels;

display control means for generating gradation indicating signals for indicating a display gradation of each of said pixels of said liquid-crystal display means;

driving means coupled to said common electrodes, to said segment electrodes, and to said display control means, for applying signals to said segment electrodes while simultaneously selecting more than one common electrode of said common electrodes, to drive said liquid-crystal display means by supplying common signals to said common electrodes, said driving means including compensating means for supplying compensated signals obtained by compensating the gradation indicating signal to said segment electrodes so as to decrease a difference between a gradation of each pixel indicated by said gradation indicating signal and an actually displayed gradation, the gradation difference resulting from the simultaneous selection of more than one common electrode;

wherein said driving means includes:

segment driving means, provided for each of said segment electrodes, for attenuating a series of corresponding n signals applied to corresponding ones of said segment electrodes at predetermined attenuating factors, where n is a positive integer; for subtracting the sum of attenuated signals from the corresponding gradation indicating signal, to produce a difference signal; and for applying the difference signal to said segment electrodes;

and common driving means for supplying simultaneously selected k common electrodes with a signal whose effective value increases in the order of selection of the common electrodes, where k is an integer of at least 2.

16. A liquid-crystal display according to claim 15, wherein said common driving mean includes means connected to receive a plurality of different voltages, for sequentially selecting the voltages in an increasing voltage order for application to said common electrodes.

17. A liquid-crystal display according to claim 15, wherein said common driving means includes means for supplying said common electrodes with pulse signals having substantial pulse widths which increase sequentially.

* * * * *